United States Patent [19]

McClendon, Jr.

[11] Patent Number: 4,953,494

[45] Date of Patent: Sep. 4, 1990

[54] METHOD FOR MOLDING LARGE PLASTIC UNITARY CORE BOATS

[76] Inventor: Zach McClendon, Jr., Rte. 2, Box 31B, Monticello, Ark. 71655

[21] Appl. No.: 195,910

[22] Filed: May 19, 1988

Related U.S. Application Data

[63] Continuation of Ser. No. 1,367, Jan. 8, 1987, abandoned.

[51] Int. Cl.⁵ .............................................. B63B 35/00
[52] U.S. Cl. ................................................... 114/357
[58] Field of Search ....................... 114/355, 357, 347; 441/74; 156/245, 214, 228

[56] References Cited

U.S. PATENT DOCUMENTS

| | | | |
|---|---|---|---|
| 2,866,985 | 1/1959 | Blackmore | 114/357 |
| 3,599,257 | 8/1971 | Erickson | 114/357 |
| 4,161,796 | 7/1979 | Kostanecki | 114/357 |
| 4,679,522 | 7/1987 | Nishida | 114/357 |

FOREIGN PATENT DOCUMENTS 1003032 9/1965 United Kingdom ................ 114/357

Primary Examiner—Sherman D. Basinger
Assistant Examiner—Stephen P. Avila
Attorney, Agent, or Firm—Arnold, White & Durkee

[57] ABSTRACT

A plastic boat and method for molding the same wherein a polystyrene core is molded and cured before enclosing it between polyethylene inner and outer skins. The inner and outer skins are molded from matching molds for a perfect fit around the core.

16 Claims, 1 Drawing Sheet

METHOD FOR MOLDING LARGE PLASTIC UNITARY CORE BOATS

CROSS-REFERENCE TO RELATED APPLICATION

This application is a continuation of U.S. application Ser. No. 001,367, filed Jan. 8, 1987 and now abandoned, for A Method For Molding Structures. Applicant incorporates said application Ser. No. 001,367 by reference herein, and claims the benefit of said application for all purposes pursuant to 37 C.F.R. §1.78.

BACKGROUND OF THE INVENTION

1. Field of the Invention

This invention relates generally to plastic boats and to a method for making the same. More specifically, the invention relates to boats made of a molded polystyrene unitary core with molded, high strength plastic inner and outer skins.

2. Description of the Prior Art

A large number of products are made which have a plastic foam core and a skin or shell made of a higher density plastic. This type of structure has been particularly attractive in products which require good thermal or sound insulating properties. Ice chests are a good example of such products.

The foamed core/plastic skin structure has also been attractive in products where light weight or safety is desired. Safety is a factor, for example, in items such as cosmetic jars where glass and ceramics have proven to be quite frangible.

While the foamed core/plastic skin structure has a number of desirable properties, the structure thus far has been limited to products which are relatively small, such as surfboards. The structure, however, would be very attractive in work boats and other large boats because of its light weight, strength, and low production and material costs. Unfortunately, attempts to adapt the structure to such large-size products have met with discouraging results.

These attempts, for the most part, have involved the use of the well-known technique of forming a foamed polyurethane core, in place, between an inner plastic skin and an outer plastic skin. Liquid polyurethane is injected, by methods such as spraying or pouring, into the volume defined by the inner and outer skins and then foamed in place. The technique is relatively simple, but it has proven to have serious shortcomings when making large products, such as work boats.

In particular, it has been found that the polyurethane core frequently continues to expand with time, thereby causing the products to take on a lumpy appearance. These problems have limited the application of the foam core/plastic skin structure to large products. This has been especially unfortunate for the boat industry, because the good properties of the structure are especially applicable to large boats. It is this very application that the present invention now makes possible.

Other attempts have been made to manufacture boats using a molded plastic shell filled with a multiple piece core. Such a boat is disclosed in U.S. Pat. No. 3,611,461 to Wurzberger. A multi-piece core does not offer the same structural integrity as a unitary core, and is therefore less suited to carrying the heavier loads associated with large work boats. The present invention is directed towards a large work boat consisting of a unitary core such that it will possess the necessary structural integrity to carry the loads normally carried by large work boats.

SUMMARY OF THE INVENTION

The present invention, in one embodiment, comprises a method of making a boat which involves the steps of molding and curing a single piece or unitary polystyrene core having a thickness of at least one foot in all dimensions; individually molding inner and outer skins of a high density plastic, preferably ABS or polyethylene; and assembling and bonding the core and the skins together.

The inner and outer skins are configured to match the inner and outer surfaces of the core, respectively. The skins are substantially thinner in cross-sectional thickness than the core.

The present invention, in a second embodiment, resides in a boat structure which comprises a molded unitary polystyrene core having a thickness of at least one foot in all dimensions bonded to individually molded inner and outer skins of high density plastic which cover and seal the core. As shown in FIG. 3, the molded unitary polystyrene core extends from the bow to the stern of the boat.

In contrast to the widely used prior art method of pouring or spraying a polyurethane core in place between an inner skin and an outer skin, the method of the present invention molds and cures a polystyrene core before sealing it between the inner and outer skins. Thus, the polystyrene core may be heat cured in advance of assembling the core between the inner and outer skins.

The use of polystyrene plastic rather than polyurethane greatly reduces the cost of the core. Additionally, the use of matching molds for the core and the inner and outer skins insures an exact fit.

The present invention is also directed toward a boat that is much larger in size than prior art objects with a foam core and an outer skin. These large boats may be used in applications such as transporting industrial equipment or several people, which smaller boats are incapable of being used for. The one foot thickness of the core of the present invention provides the structural integrity needed for the intended function of these boats. The individually molded inner and outer skins of the present invention provide a means of coating a boat core having a complex geometry.

DETAILED DESCRIPTION OF THE PREFERRED EMBODIMENT

The present invention in one aspect provides a process of making a boat by forming and molding a polystyrene unitary core having a thickness of at least one foot in all dimensions. This core is then enclosed between individually molded inner and outer polyethylene or ABS (acrylonitrile butadiene styrene) plastic skins. This method produces a boat which is lightweight, high in strength, low in material and production cost, and smooth in texture. The texture is markedly better than the texture obtained with the prior art method of spraying or pouring polyurethane foam between an inner and outer skin.

Figure 1:
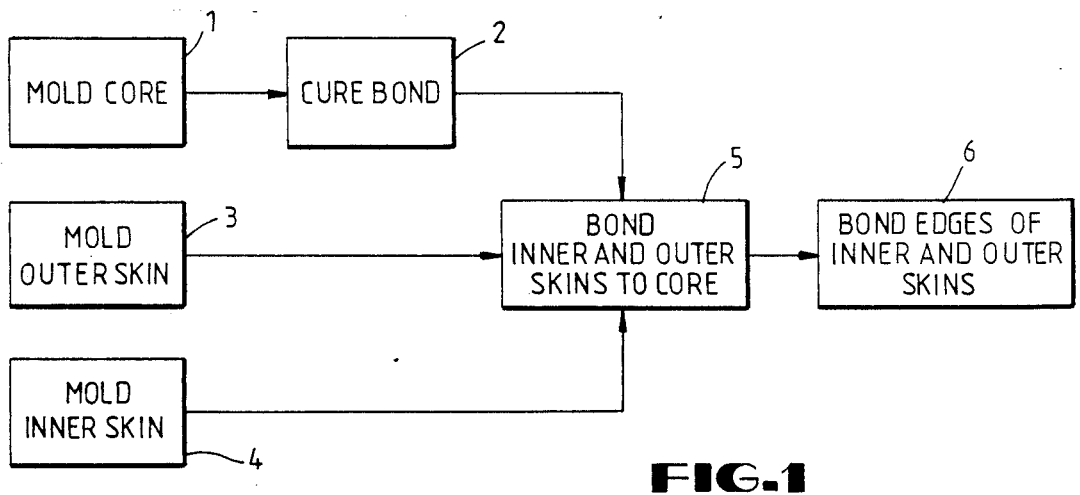
FIG. 1 is a block diagram of the steps involved in a preferred method of molding a boat structure having a core enclosed between an inner skin and an outer skin.

The process according to the present invention is diagramatically shown in FIG. 1. The first step involves molding a unitary core from polystyrene plastic. The core should have a thickness of at least one foot in all dimensions. In a preferred embodiment, the inner surface of the core is concave and the outer surface of the core is convex.

Figure 2:
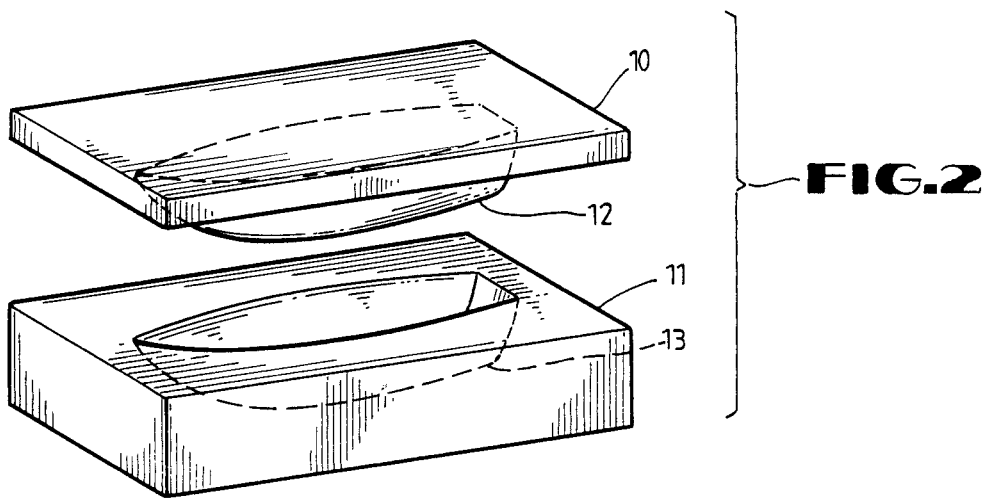
FIG. 2 is a perspective view of typical male and female molds used for practicing the method of the present invention.
Figure 3:
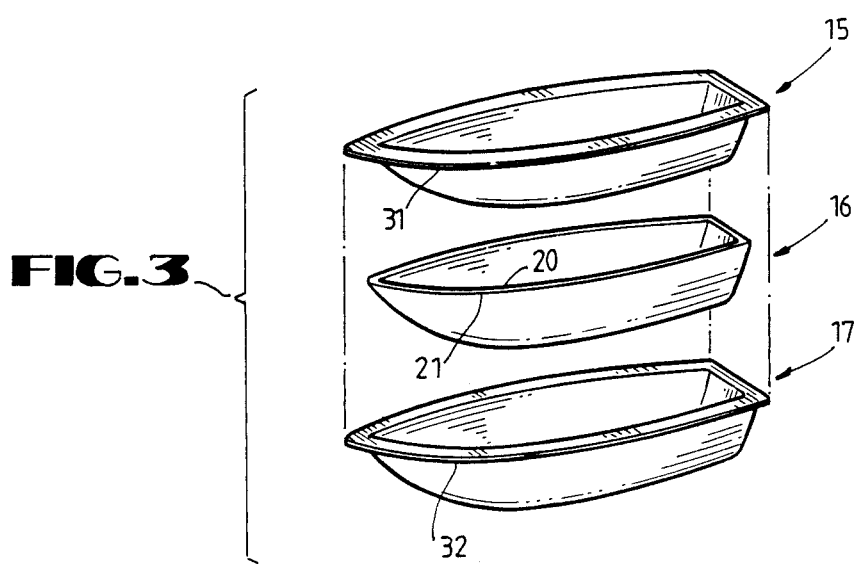
FIG. 3 is a perspective, exploded view showing a molded core, inner skin, and an outer skin before assembly.

As shown in FIG. 2, a matching male mold 10 having a projection 12, and a female mold 11 having a matched recess 13 are used to mold a polystyrene core such as core 16 in FIG. 3. The molds may be comprised of any suitable material such as fiberglass or aluminum. Compression molding or injection molding may be used depending on the temperature, heating time and cooling time needed to suit the material and the volume of polystyrene being handled.

Referring again to FIG. 1, after the core 16 has been molded and removed from the mold, the second step involves heat curing the core so that it is stable and not subject to post-expansion. By avoiding post-expansion, it is not necessary to shave, cut or shape the core at a later time to remove bulges which might otherwise develop in the inner and outer skins.

In steps 3 and 4, the outer skin 17 and the inner skin 15 are individually or separately molded. The inner skin 15 and the outer skin 17 should each preferably have a thickness of less than about ¼ inch and should be formed from matching molds in order to obtain an exact fit with the core 16. As stated earlier, the inner and outer skins are preferably formed of ABS or polyethylene plastic.

After the inner and outer skins have been molded and removed from the mold, the inner surface 20 and the outer surface 21 of the core are coated with an adhesive or glue that is compatible with polystyrene, and the plastic skins. The inner surface and outer surface of the core are precisely matched with the inner skin 15 and the outer skin 17, whereupon these skins are then bonded to the core. As shown in FIG. 3, the inner skin 15 and the outer skin 17 comprise the outer surface of the boat.

In step 6, the mating edges 31 and 32 of the outer and inner skin are bonded together to seal and enclose the core. This process is shown generally in FIG. 3. The bonding of the mating edges 31 and 32 of the inner and outer skin may be accomplished by thermally welding or welding with glue.

The method of the present invention is much faster in production and assembly times than the prior art method of spraying or pouring polyurethane foam between two layers of polyethylene. Furthermore, the method yields a product in which no shaving, shaping or cutting of the core is required to assure a smooth outer texture. Moreover, the use of polystyrene for the core rather than polyurethane greatly reduces the cost for producing canoes and other large boats.

This description is illustrative only and is for the purpose of teaching those skilled in the art the general manner of carrying out the invention. The embodiments of the invention shown and described herein are the presently preferred embodiments of the invention. It will be apparent to those skilled in this art that many modifications and changes in the method set forth are possible without departing from the scope and spirit of the invention. It is intended that the following claims be interpreted to embrace all such modifications and changes.

What is claimed is:

1. A method for making a large boat comprising the steps of:
   a. molding a unitary plastic foam core extending from bow to stern having an inner surface and an outer surface, said core having a thickness of at least one foot in all dimensions;
   b. heat curing the core;
   c. individually molding an outer skin configured to match the outer surface of the core, and having a mating edge, said outer skin being substantially thinner in cross-sectional thickness than said core;
   d. individually molding an inner skin configured to match the inner surface of the core, and having a mating edge, said inner skin being substantially thinner in cross-sectional thickness than said core;
   e. bonding the outer skin and the inner skin to the outer and inner surfaces, respectively, of the core; and
   f. bonding together the mating edges of the outer skin and the inner skin to sealingly enclose the core.

2. The method of claim 1 wherein said core comprises polystyrene foam.

3. The method of claim 1 wherein said inner skin and outer skin are composed of polyethylene plastic.

4. The method of claim 1 wherein the mating edges of the inner skin and the outer skin are thermally welded together.

5. The method of claim 1 wherein the mating edges of the inner skin and the outer skin are glued together.

6. The method of claim 1 wherein the outer skin and the inner skin are bonded to the core by an adhesive substantially coating the outer and inner surfaces of the core.

7. A large boat made according to the process of claim 1.

8. A method for producing a large boat comprising the steps of:
   a. molding a unitary plastic foam core extending from bow to stern having a thickness of at least one foot in all dimensions, said core having a concave inner surface and a convex outer surface;
   b. heat curing the core;
   c. individually molding an outer skin configured to match the convex outer surface of the core, and having a mating edge, said outer skin being substantially thinner in cross-sectional thickness than said core;
   d. individually molding an inner skin configured to match the concave inner surface of the core, and having a mating edge, said inner surface being substantially thinner in cross-sectional thickness than said core;
   e. bonding the outer skin to the convex outer surface of the core;
   f. bonding the inner skin to the concave inner surface of the core; and
   g. bonding together the mating edges of the outer skin and the inner skin to sealingly enclose the core.

9. The method of claim 8 wherein the mating edge of the outer skin and the inner skin are thermally welded together.

10. The method of claim 8 wherein the mating edges of the outer skin and the inner skin are glued together.

11. The method of claim 8 wherein the outer skin and inner skin are bonded to the core by using an adhesive to substantially cover the outer and inner surfaces of the core.

12. A large boat made according to the process of claim 8.

13. A large boat comprising:
   a. a molded unitary polystyrene core extending from bow to stern having a thickness of at least one foot in all dimensions, said core having an inner surface and an outer surface;
   b. an individually molded inner skin adhesively bonded to the inner surface of said core; and
   c. an individually molded outer skin adhesively bonded to the outer surface of said core.

14. The boat of claim 13 wherein said inner skin and said outer skin having mating edges.

15. A large boat comprising:
   a. a molded unitary polystyrene core extending from bow to stern having a thickness of at least one foot in all dimensions, said core have an inner surface and an outer surface;
   b. an individually molded inner skin adhesively bonded directly to the inner surface of said core; and
   c. an individually molded outer skin adhesively bonded directly to the outer surface of said core.

16. The boat of claim 15 wherein said inner skin and said outer skin comprise the outer surface of said boat.

* * * * *